(12) United States Patent
Gantenbein et al.

(10) Patent No.: US 7,717,357 B2
(45) Date of Patent: May 18, 2010

(54) METHOD FOR RAPID INSULATION OF EXPANSES

(75) Inventors: Stefan Gantenbein, Medina, OH (US); Thomas L. Fishback, Cuyahoga Falls, OH (US); Paul Hurray, Akron, OH (US); Anthony J. Taylor, Medina, OH (US); Richard L. Dansizen, Bolivar, OH (US)

(73) Assignee: Fomo Products, Inc., Norton, OH (US)

( * ) Notice: Subject to any disclaimer, the term of this patent is extended or adjusted under 35 U.S.C. 154(b) by 1057 days.

(21) Appl. No.: 11/306,722

(22) Filed: Jan. 9, 2006

(65) Prior Publication Data

US 2006/0192033 A1 Aug. 31, 2006
US 2007/0290074 A9 Dec. 20, 2007

(51) Int. Cl.
*B05B 1/24* (2006.01)
(52) U.S. Cl. .............................. 239/13; 239/8; 239/135; 239/304; 239/414; 239/432; 239/433; 239/525; 239/597; 239/601; 222/145.6; 222/146.1
(58) Field of Classification Search ............... 239/8, 239/10, 13, 128, 135, 303, 304, 413, 414, 239/432, 433, 525, 597, 601; 222/137, 145.5, 222/145.6, 146.1
See application file for complete search history.

(56) References Cited

U.S. PATENT DOCUMENTS

| | | | | |
|---|---|---|---|---|
| 3,559,890 A | * | 2/1971 | Brooks et al. ............... | 239/304 |
| 3,633,795 A | * | 1/1972 | Brooks ....................... | 239/432 |
| 5,005,765 A | * | 4/1991 | Kistner ....................... | 239/135 |
| 5,129,581 A | * | 7/1992 | Braun et al. ................ | 239/414 |
| 6,283,221 B2 | * | 9/2001 | Hurray et al. ............ | 222/145.6 |
| 6,533,189 B2 | * | 3/2003 | Kott et al. ...................... | 239/8 |

* cited by examiner

*Primary Examiner*—Steven J Ganey
(74) *Attorney, Agent, or Firm*—Louis F. Wagner; Hahn Loeser + Parks LLP (57) ABSTRACT

A process for cost-effectively and rapidly insulating a desired surface with spray foam insulation is described which includes the application of a polyurethane foam dispensed through heated conduits into a dispensing gun having a nozzle with essentially planar divergent lips having a triangular prism opening, the lips of the nozzle diverging at an angle of between about 5 and 35° inclusive, more preferably between 8 to 15° inclusive, most preferably 10 to 12° inclusive, thereby achieving application rates which are in excess of 70 $Ft^2$/min, and optimally in excess of 100 $Ft^2$/min.

20 Claims, 8 Drawing Sheets

METHOD FOR RAPID INSULATION OF EXPANSES

TECHNICAL FIELD

This invention relates generally to a method of rapidly insulating a desired surface using a polyurethane froth foam for in-situ application of two-component polyurethane foam, and more specifically to a method of using a foam application gun with a two-component polyurethane foam insulation to rapidly insulate surfaces under all weather conditions including temperatures as low as 20° F.

BACKGROUND OF THE INVENTION

There are numerous applications in which spray polyurethane foam is used at a site for any number of applications in, but the most traditional use in the building trades is as a source of insulation. The Department of Energy reports that every year the average home wastes up to 40% of the energy used for heating and cooling as air moves through gaps, penetrations, and cracks in the exterior shell of the house, also known as the building envelope. Spray foam insulation is gaining in popularity because of its many benefits over conventional fiberglass insulation. Spray foam is able to fill in cracks and crevices which are too small for fiberglass insulation. The seamless application of the spray foam eliminates air infiltration, which reduces energy waste. Polyurethane spray foam insulation acts as a sound insulator, reduces vibration, and improves the indoor air quality. Also, polyurethane has the highest resistance to heat transfer, called R-value, per thickness of any common insulating product. Polyurethane spray foams are also moisture, mold, fungus, and insect repellant.

When using insulation, two factors are considered important: the resistance to heat transfer (R-value); and the ability to act as an air barrier. A high R-value indicates heat will travel slowly through the material. A low R-value indicates heat will travel quickly through the material. R-value is calculated by a formula that considers the thermal conductivity, k, and the thickness of the material. It is essential to consider the thickness of the material because a very thick material with a very high R-value over the total thickness, might have a lower R-value per unit than a very thin material with an average R-value. Closed cell polyurethane foam insulation has the highest R-value per thickness of any common insulating material.

The ability of the insulation to act as an air barrier is also critical. Pressure differences between the inside and outside of an enclosure cause air leakage to occur. Differences in pressure can be caused by many environmental factors such as temperature differences and wind. Air leakage contributes to warm air leaving an insulated area and cold air entering the area and can occur through cracks, gaps, openings, or through porous walls and insulation. An ideal insulation will minimize air leakage, keeping the warm air inside and the cold air outside of the insulated enclosure. Polyurethane foam insulations act as an air tight barrier, significantly lowering air infiltration.

The polyurethane foam insulation for such in-situ applications is typically supplied as a one-component froth foam or a two-component froth foam. A one-component foam means both the resin and isocyanate for the foam are supplied in a single pressurized container and dispensed from the container through a valve or gun attached to the container.

A two-component "froth" foam means one component is supplied in one pressurized container, typically the "A" container (i.e., polymeric isocyanate, fluorocarbons etc) while the resin is supplied in a second pressurized container, typically the "B" container (i.e., polyols, catalyst, blowing agents, flame retardants etc.). There are advantages and disadvantages to one-component and two-component foams. One advantage of the two-component system is its relatively long shelf life resulting from the fact that the chemicals are not mixed until they encounter one-another in the dispensing gun. This invention relates to two-component foams.

Typically two-component kits use pressurized cylinders about 7½" in diameter, containing 1-5 gallons (10-50 pounds) which are connected by hoses to a dispensing gun. The two components of the foam are combined in the dispensing gun, and applied directly to the surface being insulated. When the two components combine, an exothermic reaction takes place allowing the gases in the froth to expand, forming small bubbles which become trapped in the mixture. Time must be given to allow the foam to cure and harden, giving it the ability to support itself. The volume of the foam expands as it cures, the amount of expansion that occurs is controlled by the formula of the foam being used. Polyurethane foam has natural adhesive qualities which allow such foams to bond strongly to any number of substrate surfaces.

As the foam cures, the gas bubbles trapped in the foam cause the pressure within the mixture to fall below that of the environment it is in. As air from the environment enters the mixture the pressure within the foam is restored to the levels of its surrounding, causing the foam to harden from the outside towards the surface it is applied to. As the foam hardens the R-value increases until it is completely cured. The time this process takes, as well as the final density of the foam varies with the specific formula of the foam being used.

Polyurethane froth foam reacts with water, and therefore must be applied only to dry surfaces. Humidity within the environment in which the foam is being applied should also be considered. The presence of high humidity in the environment or moisture on the surface being sprayed degrades the adhesion of the foam to the surface, disrupting the complete bonding to the desired surface and allowing the foam to be easily peeled off the wall. Cold temperatures have the same affect on the foam, causing the moisture on the substrate to freeze into ice crystals, disrupting bonding to the desired surface. The surface being sprayed and the ambient temperature must be of a minimum temperature that varies with the formula of the foam and the dispensing system being used to apply the foam. The technical data sheet for a popular polyurethane spray foam that is commonly used in the industry currently specifies the spray foam only be applied between temperatures of 50° F. and 110° F.

Variations of the elements of spray foam application systems are known in prior art. Examples of two-part foam dispensing guns can be found in Fomo Products, Inc.'s U.S. Pat. No. 4,550,863; Fomo Products, Inc.'s U.S. Pat. No. 5,242,115; Fomo Products, Inc.'s U.S. Pat. No. 5,429,308; and Fomo Products, Inc.'s U.S. Pat. No. 6,345,776. Examples of a nozzle for a two-part foam dispensing gun can be found in Fomo Products, Inc.'s U.S. Pat. No. 6,840,462. Spray foam polyurethane insulation are also commercially available, for example DOW Chemical's SPF insulation system, however the system of this invention contains numerous performance improvements over current commercially available systems such as increased application rates and the ability to be utilized under a broader range of environmental factors. To date the elements of the system of this invention as well as the extra features incorporated into this invention have not been combined to find a solution to the industry need for a portable, rapid system for insulating desired surfaces in the harsh construction environment which allow a two-component foam to be applied at temperatures lower than 50° F., certainly lower than 32° F., and more preferably at temperatures as low as 20° F. without peeling.

SUMMARY OF THE INVENTION

Accordingly it is a principal object of the invention to provide a portable system that allows the operator to rapidly insulate the desired surface over a broad range of temperature and environmental factors.

It is another object of this invention to provide a system for insulating the desired surface in a time-efficient and quick manner, by providing a wide angle spray nozzle for the foam dispensing gun that allows for maximum spray coverage area.

It is yet another object of this invention to provide a system for rapidly insulating the desired surface in cold environments, more specifically in environments wherein the temperature of the ambient air and/or the desired surface area intended to be sprayed with the insulating foam is at or above 20° Fahrenheit.

The above mentioned objects are achieved in the invention by providing a system comprised of two pressurized tanks for the storage of the chemicals necessary for the two-part froth spray foam, tubing preferably lined with heating elements to transport the chemicals from the pressurized tanks, and a spray gun which combines the chemicals from the two pressurized tanks and sprays the froth foam insulation through a specially designed fan-type nozzle with optimal spray coverage area. The elements of the system combine to allow rapid application of spray insulation under the extreme environmental conditions that are often present at construction sites where the system will most commonly be utilized. The system can be used to apply spray insulation to a variety of surfaces, including but not limited to exterior walls, interior walls, spaces between 2×4's, ceilings, and floors. The surface being sprayed is not limited to any texture, material, substrate, or shape, and can be regular or irregular in geometry, have crevices, voids, or holes, and have or not have wires, pipes, and other building materials within. In general, the polyurethane spray foam will bond with any material or substrate that can be painted.

The first element of the system for rapidly applying spray froth foam insulation to a desired surface is the chemical storage system. The invention utilizes a two-component foam, and therefore requires two separate storage tanks to isolate the two components of the foam so combination of the components does not occur during storage. The storage tanks are often referred to as the "A" component tank and the "B" component tank. The size and fill pressure of the tanks is not limited by this invention and can be large or small, and preferably use low pressure, for example 300 psi or less, preferably 200 psi or less, as is necessary for the size of the construction job on which they will be used. This is a highly desirable feature in that many commonly used insulation systems use higher pressure to dispense the foam, for example 500 psi or greater. However, with the system of this invention, the size and fill pressure of the tanks should be such that the tanks are easily transportable by the operator alone or with the help of a cart, dolly, or other moving device for easy portability to remote job sites. Most commonly, the "A" component tank and the "B" component tank will be the same size so the time each can be used before becoming empty will be the same, as the chemicals are ideally combined at an equal rate and the component tanks are ideally replaced at the same time. When the chemical tanks become empty they can be replaced with a full tank of the same or different size or pressure. The tanks must be pressurized during use. Most commonly, a nitrogen bottle or cylinder is used for this purpose. The chemicals used for one embodiment of this invention are kept under low pressure, compared with the dispensing pressure of other commercial spray foam products.

The second element of the rapid spray insulating system is the transfer lines or tubes that are used to transport the chemical components for the spray froth foam insulation to the dispensing gun. The tubing will ideally have one or more heating elements that run along the length of the hose. The heating elements are powered by a standard 120V/60 Hz outlet, and can be plugged in to any common household or building outlet, or any construction site 120V electrical feed line. The tubing is lightweight, portable, and durable. The hose can be of any length, optimally yet preferably sheathed with a fiberglass weave, with a generally accepted maximum length of 200 feet. No pumps or motors are required to force the chemical components of the two-part foam through the tubes towards the spray gun.

The last element of the rapid spray insulating system is the spray gun used to dispense the froth foam insulation onto the desired surface. The two components of the spray froth foam (the "A" component and the "B" component) are combined within the dispensing gun. The spray pattern of the foam is determined by the nozzle that is attached to the spray gun. A specially designed triangular prism shaped nozzle with an optimal wide spray pattern is used with the system of this invention. The broad spray pattern of the triangular prism type nozzle is ideal and is used for most in situ construction wall, floor, and ceiling insulation purposes.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Referring now to the drawings wherein the showings are for purposes of illustrating the preferred embodiment of the invention only and not for purposes of limiting the same, the Figures show a preferred embodiment of the invention which provides for the rapid insulation of a desired surface using a two-component spray polyurethane froth foam system. Similar reference numbers refer to similar parts throughout the drawings.

Figure 1:
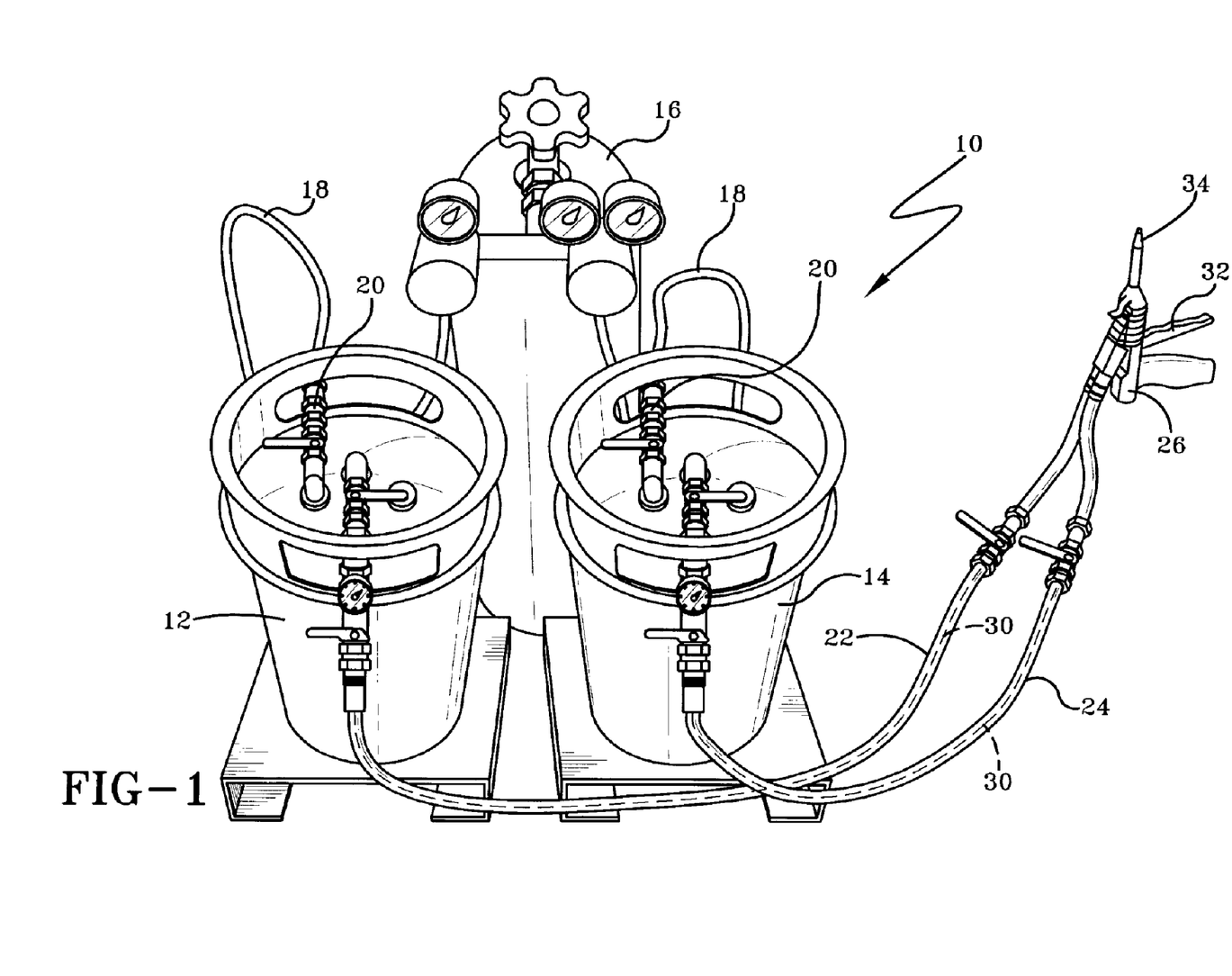
FIG. 1 is a front perspective view of the system for rapidly insulating a surface with a two-component polyurethane spray froth foam.
Figure 2:
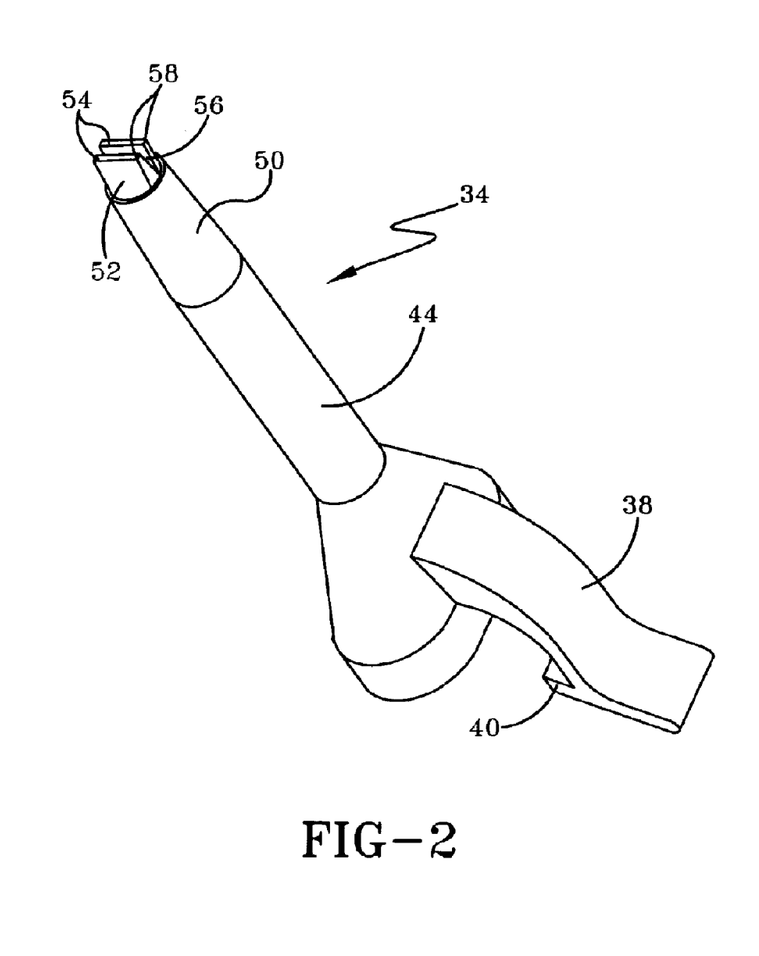
FIG. 2 is a front perspective view of a nozzle having a triangular prism-shaped opening of this invention.

A diagram of the equipment used in the invention described herein is shown in FIG. 1. Two tanks 12 and 14 separately store the chemical components (the "A" component and the "B" component) of the two-component polyurethane foam. The chemical storage tanks 12 and 14 are ideally the same size, as the chemicals within are combined at equal rates during use of the spray polyurethane foam insulation system 10. When the chemicals are not combined at equal rates, undesirable properties appear within the foam, such as incorrect consistency, incorrect color, uneven application, sputtering from the nozzle, and incorrect expansion rates of the foam. The size and fill pressure of the tanks 12 and 14 are dependant on the nature of the job they are utilized on, but will ideally be transportable by the operator with the assistance of a cart, dolly, or other moving device, as the entire spray insulation system 10 is portable by the operator for convenient use at job sites.

The tanks 12 and 14 must be stored at a temperature below 120° F., more preferably at a temperature below 90° F., and most preferably at a consistent temperature of 80° F. Storage above 120° F. will substantially degrade the chemicals to an unusable state, and extended periods of storage above 90° F. may reduce the shelf life of the chemicals. Ideally, a temperature controlled "hot box" should be used for storage of the chemical storage tanks 12 and 14. A hot box is a small room or holding facility of a size that is at a minimum large enough to fit the system for rapid spray insulation within. The hot box should be sufficiently insulated and heated to maintain a controlled and consistent temperature of approximately 80° F., ensuring the chemicals will be at an appropriate temperature for immediate use of the system 10.

Proper temperature of the chemical components of the polyurethane foam are critical to optimal performance of any two-component foam spray system, including this invention. In one embodiment of this invention, the recommended chemical temperatures, when using the heated hose units are 70-80° F., and when using the unheated hose units are 75-85° F. It is important to note the chemicals must reach these temperatures through proper storage of the chemical storage tanks 12 and 14 or through passage inside the heated hoses. The chemicals cannot be immediately used if they have recently been stored or transported in an unheated environment, and must first be allowed to achieve their recommended temperatures for proper performance of the system 10. Chemical temperatures outside of the optimum ranges will adversely affect the yield, the mixing, the cure time and possibly even the properties of the foam.

One or more means for pressurizing 16 the chemical storage tanks 12 and 14 are necessary, and ideally connect to the chemical storage tanks 12 and 14 through a hose 18 and couplings 20 that attach to the top of the tanks 12 and 14. Commonly, one or more inert gas bottles or cylinders 16 (more preferably nitrogen although other compressed gases may be used if not detrimental to the formation of the foam) are used to pressurize the chemical storage tanks 12 and 14. The chemical storage tanks 12 and 14 are pressurized to preferably less than or equal to approximately 300 psi and more preferably less than or equal to approximately 200 psi. Proper pressure with the tanks 12 and 14 is critical to maintaining the proper ratio of chemicals during dispensing of the foam. Using nitrogen bottles or cylinders 16 with low pressure or inadequate levels of nitrogen can lead to inconsistent performance of the system, so it is preferable to use a full or mostly full nitrogen bottle or cylinder 16 when starting each insulation project. It is recommended for a certain embodiment of this invention to replace the nitrogen bottle or cylinder 16 when the gauge pressure of the nitrogen cylinder reaches the minimum level of 500 PSIG. Optionally a nitrogen manifold (not shown) which employs more than one bottle or cylinder can be used.

Chemical transport hoses 22 and 24 are connected to each chemical storage tank 12 and 14. The hoses 22 and 24 (not drawn to scale) serve as a conduit to transport each chemical component from its respective chemical storage tank 12 and 14 to the foam dispensing gun 26. The hoses 22 and 24 are connected to the chemical storage tanks 12 and 14 with coupling hardware and outlet valves.

The chemical transport hoses 22 and 24 are nominally limited in length, although they can be any available length at which the "A" and "B" foam components can be transported, typically less than 200 feet in length. Preferably, no pumps or motors are required to push the foam chemical components through the transport hoses. The hoses 22 and 24 will ideally have one or more heating elements 30 at least partially along in physical contact with the hoses and optimally at least partially embedded within the length of the tubing, tubing jacket, or protective sheath for continued heating control of the chemicals flowing therethrough. The continued heating of the chemicals throughout the transport hoses 22 and 24 allows for the system to be operated over a greater range of ambient air temperatures, as the chemicals will stay at their required temperature rather than loosing heat to a colder operating environment. Heated hoses allow the system to be operated earlier and later in the day when the temperatures are colder, as well as earlier and later in the year during the colder seasons. The heating elements 30 are powered by a standard 120V/60 Hz electrical outlet, which should be common at the site of operation, whether it be a construction site, home or business. The heated transport hose is thermostat controlled to maintain a constant operating temperature. If the transport hoses 22 and 24 are unheated, the system can only be operated when the ambient temperature is at or above the minimum required temperature of the chemicals for application, limiting the operation of the system to warmer times of the day and the year.

Storage and care of the hoses is also critical to proper performance of the system. The hoses 22 and 24, whether heated or unheated, should not be folded or kinked during storage or use, as it will impede the flow of the chemicals through the hose. The connection fittings of the hose 22 and 24 should always be properly lubricated to ensure maximum dependability of the connection, as well as lifespan of the connecting hardware. The hoses 22 and 24 and system 10 should be stored in a dry area when not in use. In an embodiment of this invention the hose is sheathed within a protective covering, such as woven fiberglass, so it can withstand mistreatment and improper use while still continuing to operate. Some illustrative examples of the misuse the hose can withstand while continuing to function is storage in temperatures below 0° F. for more than 2 days followed by heating of the elements, storage in temperatures above 90° F. for more than 2 days followed by heating of the elements, repeatedly twisting the gun end of hose, pulling on the gun end of hose, creating bends in the hose by pulling it around corners, dropping the hose from approximately 20 feet, running over the hose with a car and loaded semi-truck, slamming large objects on the hose, and storing the hose with chemicals inside for months.

The chemical transport hoses 22 and 24 connect the chemical storage tanks 12 and 14 to the foam dispensing gun 26. The foam dispensing gun 26 has a responsive trigger mechanism 32 to stop, start and optionally regulate the flow of the separate chemical components of the polyurethane foam through separate internal tubes within the dispensing gun 26 that transport the chemical components into the nozzle 34 that removably attaches to the front of the dispensing gun 26. The dispensing gun 26 allows for a high flow rate, supporting the maximum application rate of the nozzle 34 attachments or tips. The gun 26 and nozzle 34 are preferably made of plastic, and are disposable, but can be cleaned with appropriate solvents and reused if desired.

The two feed lines 22 and 24 outputting the two foam components into the dispensing gun 26 enter the nozzle 34 at the end of the spray gun 26, where the two components are mixed and dispensed onto the surface being insulated. The spray pattern of the dispensed foam is controlled by the removable nozzle 34 that is attached to the dispensing gun 26. As is commonly known, a broad spray pattern is most desirable for rapid applications of spray foam to surfaces, as a broad spray pattern increases the application rate, allowing the spray foam to be applied in a rapid manner increasing productivity and output.

Figure 3:
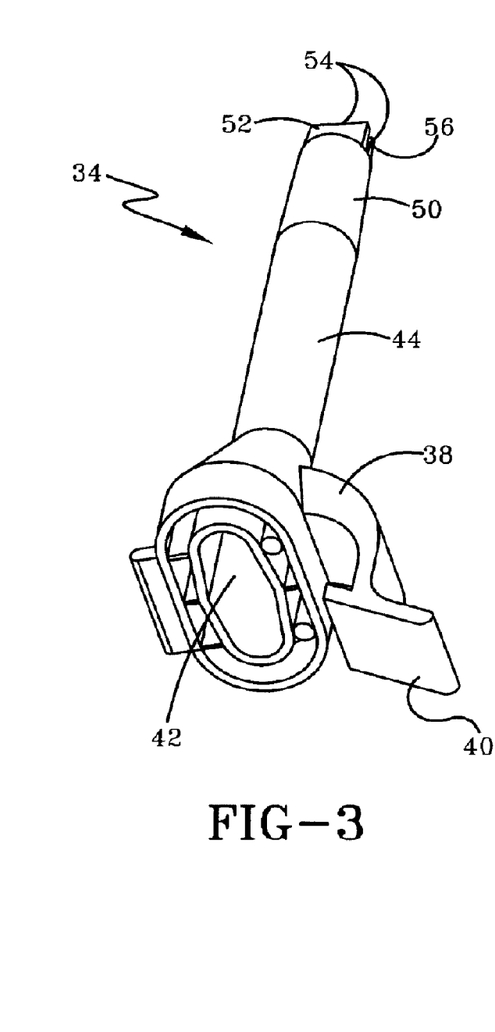
FIG. 3 is a rear perspective view of the nozzle of FIG. 2.
Figures 4, 5:
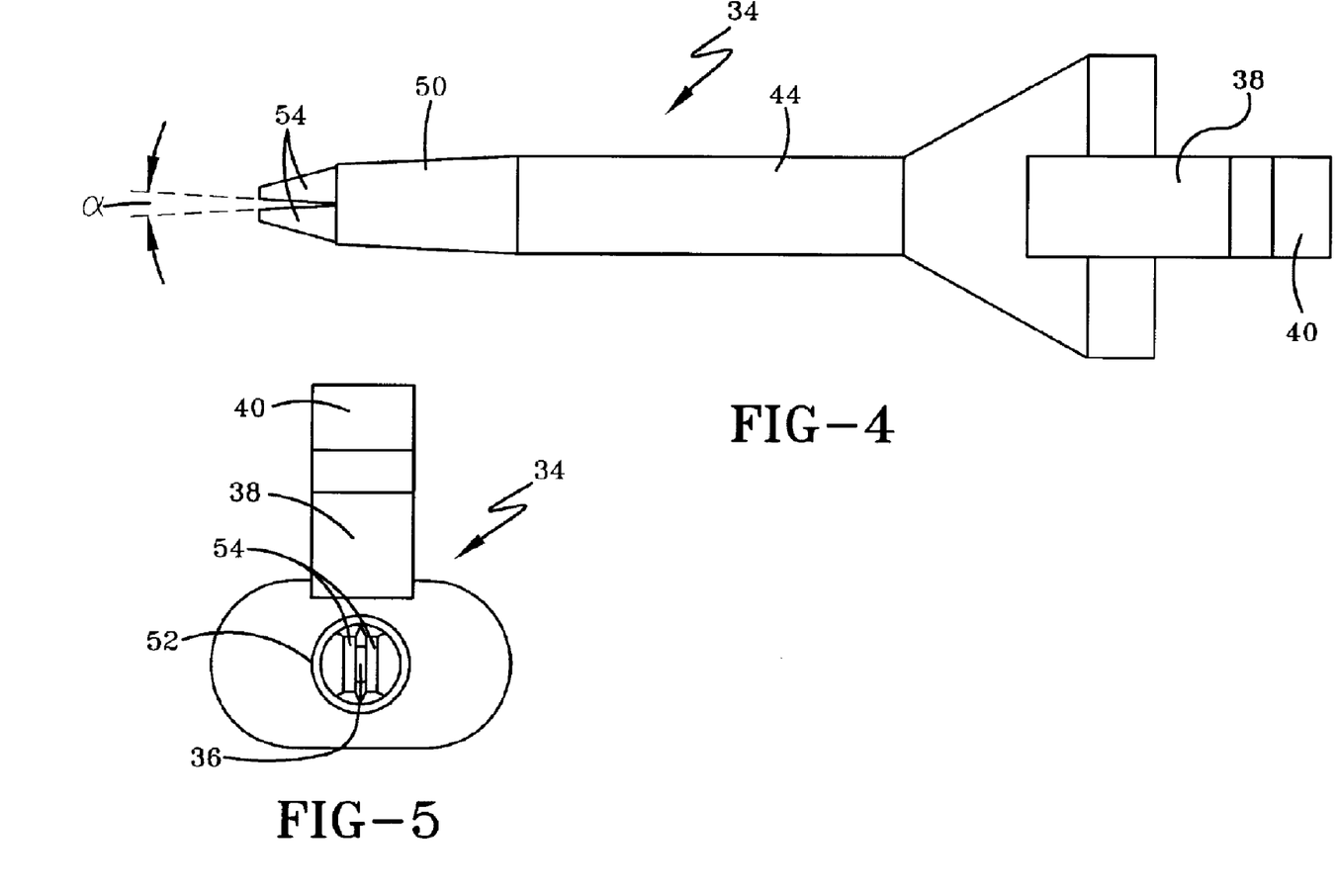
FIG. 4 is a bottom elevational view of the nozzle of FIG. 2.
FIG. 5 is a front elevational view of the nozzle of FIG. 2.
Figure 6:
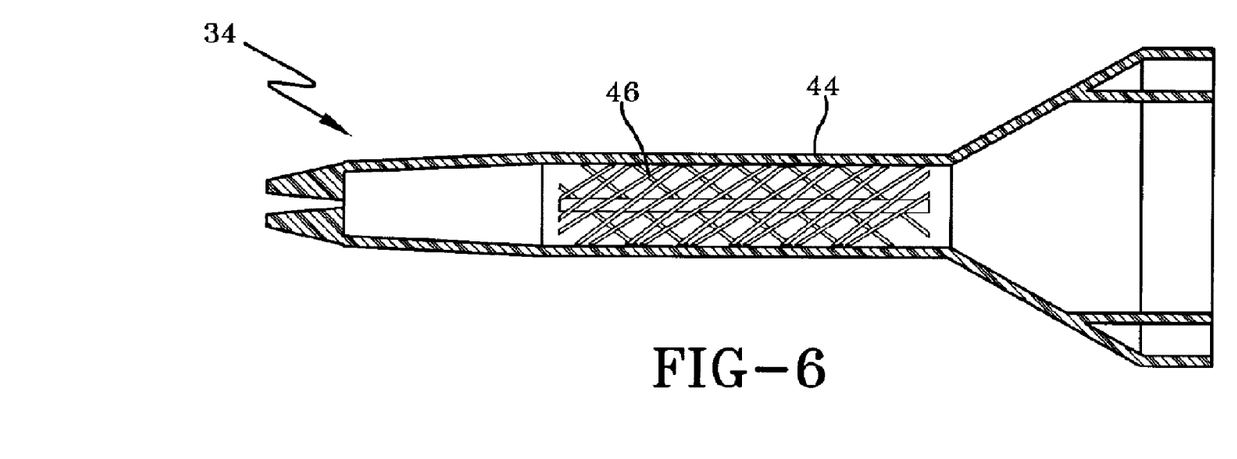
FIG. 6 is a side elevational view in cross-section of the static mixing device of the nozzle of this invention.
Figure 7:
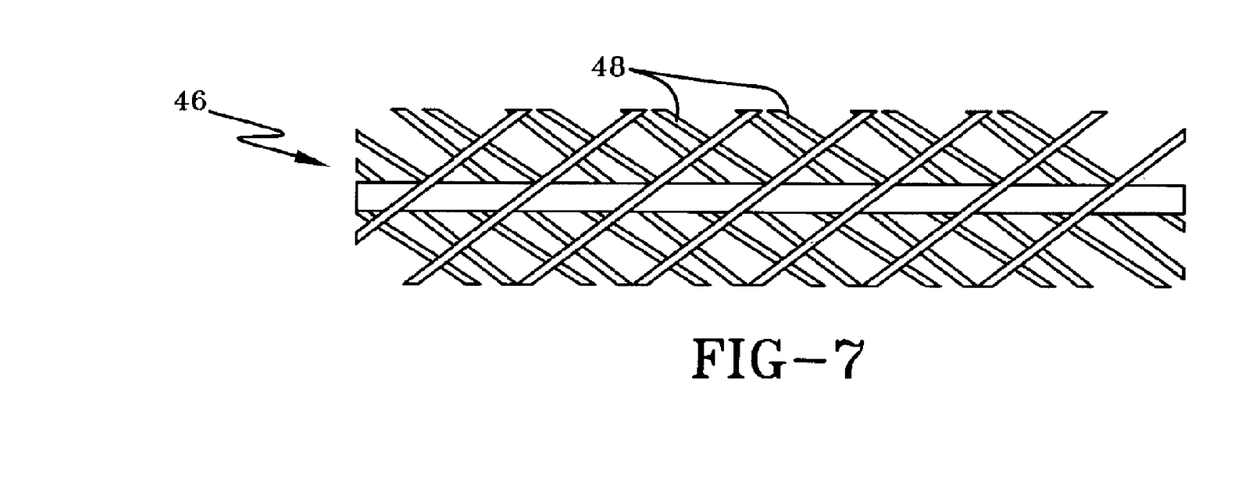
FIG. 7 is an enlarged cross sectional view of the static mixing device of FIG. 6.

An illustrative preferred example of a nozzle 34 having a triangular prism shaped opening or tip is shown in FIGS. 2-5. The nozzle 34 has a wide, flat generally rectangular opening 36, shown in FIG. 5, allowing the spray of the froth foam to expand into a broad and thin spray pattern which leads to optimal application rates allowing for rapid application of the spray foam insulation. The fan nozzle in FIGS. 2-5, is made of a plastic material and has a curvilinear downwardly-extending rear tab 38 with a locking notch 40 for clamping firmly in place on the butt of the foam dispensing gun. The spray foam components enter the input opening 42, as seen in FIG. 3, in the nozzle 34 and flow into a cylindrical volume 44 that houses an internal static mixing mechanism 46, better illustrated in FIGS. 6-7, which is a non-moving structure that consists of numerous intertwined bars and slats 48, shown in FIG. 7, that cross each other to force the combination of the two components of the foam and allow them to intimately mix together allowing the exothermic reaction between the chemicals necessary for the curing of the foam to begin as the foam is dispensed from the gun and applied to the desired surface. The nozzle 34, shown in FIGS. 2-5 has a second cylindrical volume 50 that the spray foam flows through past the internal static mixing mechanism 46 (FIGS. 6-7). The second cylindrical volume 50 begins to gradually decrease in diameter towards the tip 52 of the nozzle 34 where the spray foam is dispensed.

The tip 52 of the nozzle 34 has a pair of flared or diverging lips 54 that meet to create a triangular notch 56 near the base of the tip. The notch 56 at the base of the tip of the nozzle 34 in a most preferred embodiment is triangular in shape to ensure the wide spray pattern that contributes to the high application rates of the nozzle 34. The lips 54 diverge at an angle α between the diverging lips 54, shown in FIG. 4, preferably of 5°-35°, more preferably an angle of 8°-15° and most preferably an approximately 10°-12° angle. A gap exists between the end of the lips 54 of the nozzle 34 where the spray foam exits the nozzle 34. The corners of the diverging lips 54 appear in FIGS. 2-5 as having sharp approximately about 90° corners 58, however it is within the scope of this invention that those corners may be slightly rounded without affecting the spray pattern of the nozzle 34.

A series of controlled tests were performed to compare the application rate of the triangular prism shaped nozzle (shown in FIGS. 2-5) and foam dispensing gun of this invention (shown in FIG. 1) to nozzles and foam dispensing guns of Prior Art under ideal conditions. For the experiment each nozzle was attached to the foam dispensing gun the nozzle was designed for. The chemicals and substrate surface were brought to ambient temperature (approximately 72° F.). The chemical transport lines were heated to 80° F. for the system of this invention. The foam dispensing guns were held 12 inches from the desired surface and foam was sprayed at ½" thickness with each nozzle, the application rate of each system was measured. The triangular prism shaped nozzle 34 (FIGS. 2-5) and gun with the system of this invention (FIG. 1) had the highest application rate of 102.6 $Ft^2$/min. This data can be seen compared to the other systems in TABLE I below.

TABLE I

Application rate of combinations of guns and nozzles

Figure 8:
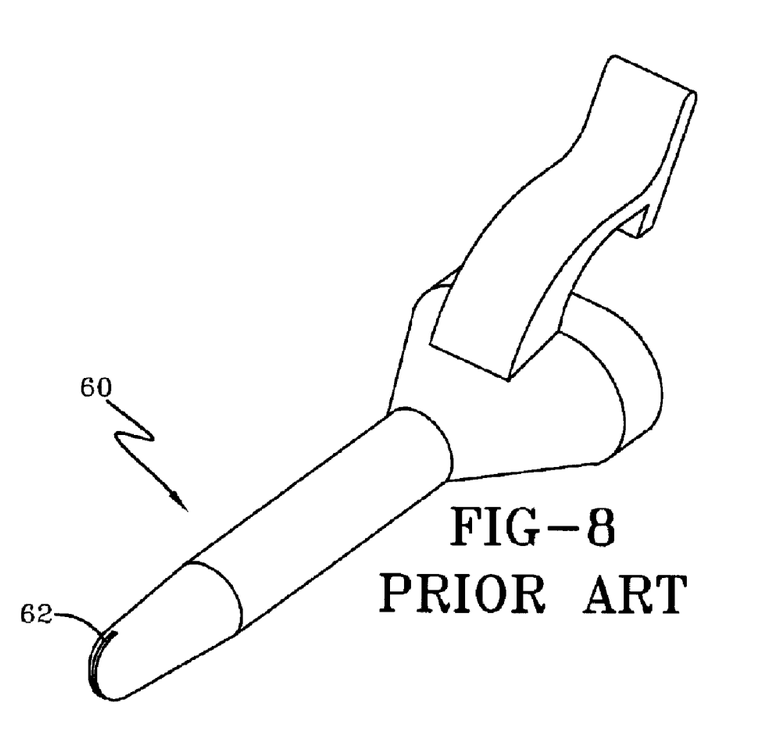
FIG. 8 is a side perspective view of a fan shaped nozzle with a curvilinear opening (Prior Art)
Figure 9:
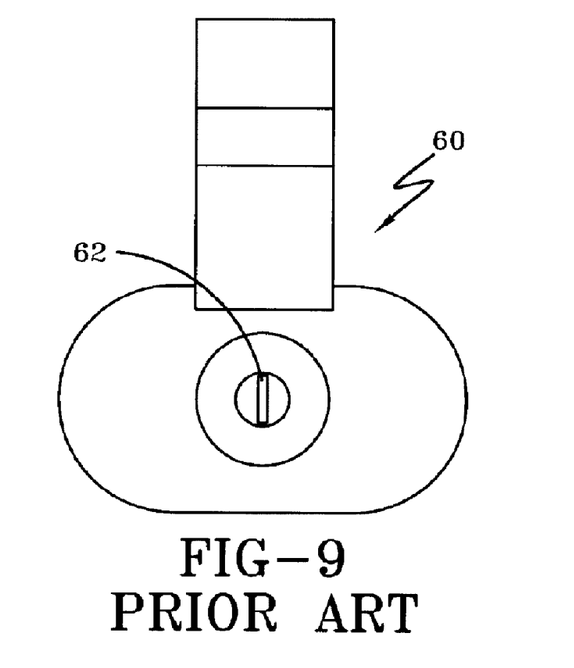
FIG. 9 is a front elevational view of the curvilinear opening of the nozzle of FIG. 8.
Figure 10:
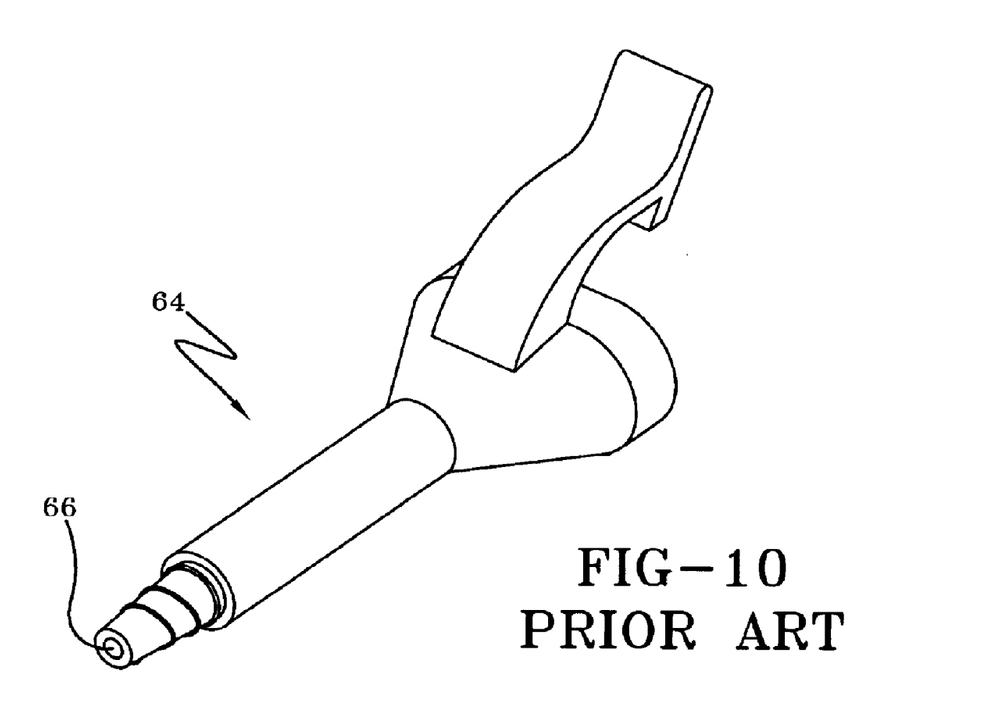
FIG. 10 is a side perspective view of a tapered nozzle with a round opening (Prior Art)
Figure 11:
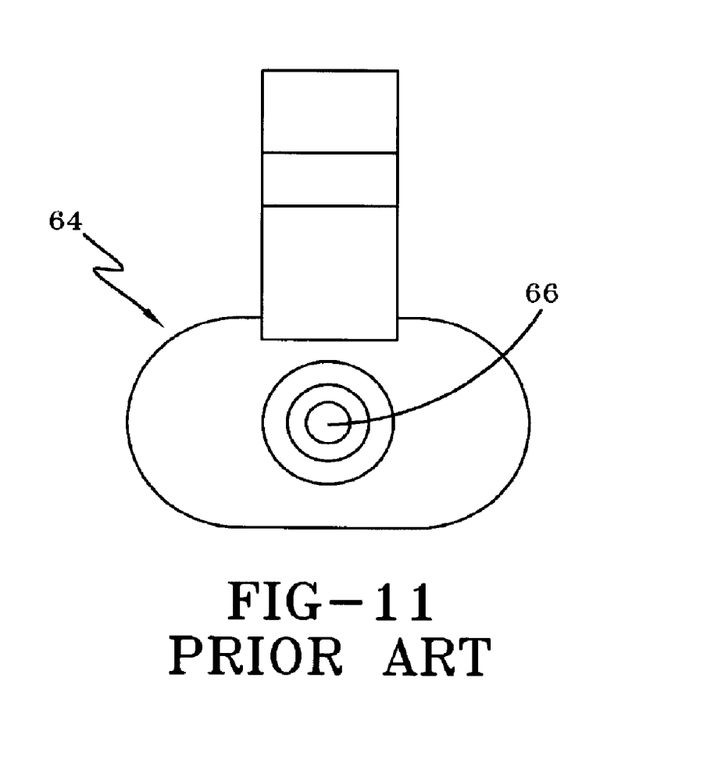
FIG. 11 is a front elevational view of the round opening of the nozzle of FIG. 10.

| Nozzle type | Application rate |
|---|---|
| Triangular prism shaped opening (Nozzle of this invention; Shown in FIGS. 2-5) | 102.6 $Ft^2$/min |
| Curvilinear fan (Prior Art of Fomo Products, Inc.; Shown as 60 with curved opening 62 in FIGS. 8-9) | 48.1 $Ft^2$/min |
| Tapered (Prior Art of Fomo Products, Inc.; Shown as 64 with circular opening 66 in FIGS. 10-11) | 66.1 $Ft^2$/min |
| Curvilinear Fan (Prior Art of Fomo Products, Inc.; Similar to FIGS. 8-9) | 39.5 $Ft^2$/min |
| Tapered (Prior Art of RHH Foam Systems; Similar to FIGS. 10-11) | 37.7 $Ft^2$/min |
| Triangular wedge shaped opening (Prior Art of Dow Chemical Company; Shown in FIGS. 12-14) | 51.3 $Ft^2$/min |

Figure 12:
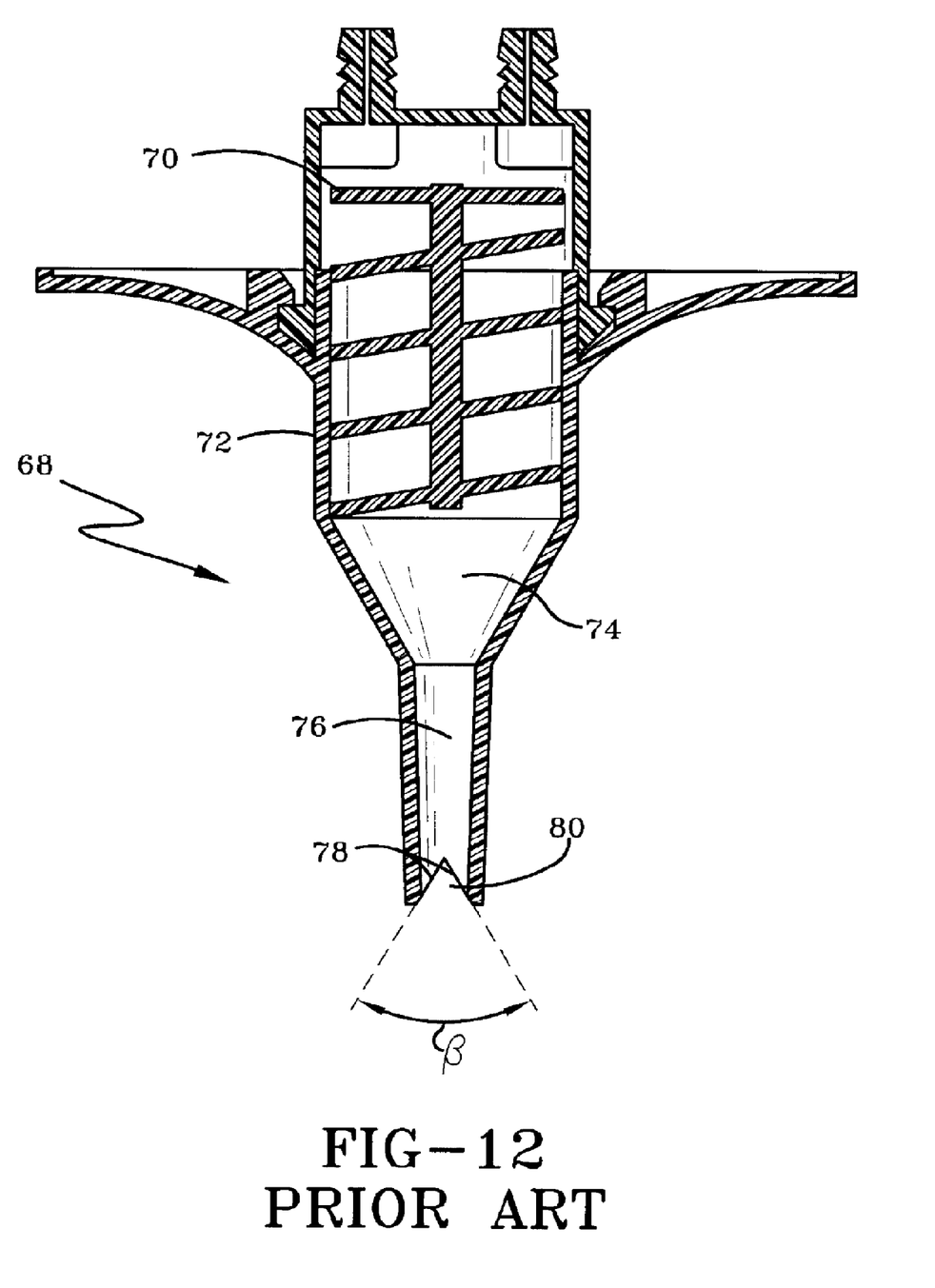
FIG. 12 is a side elevational view in cross-section of a nozzle with a triangular wedge-shaped opening (Prior Art)
Figures 13, 14:
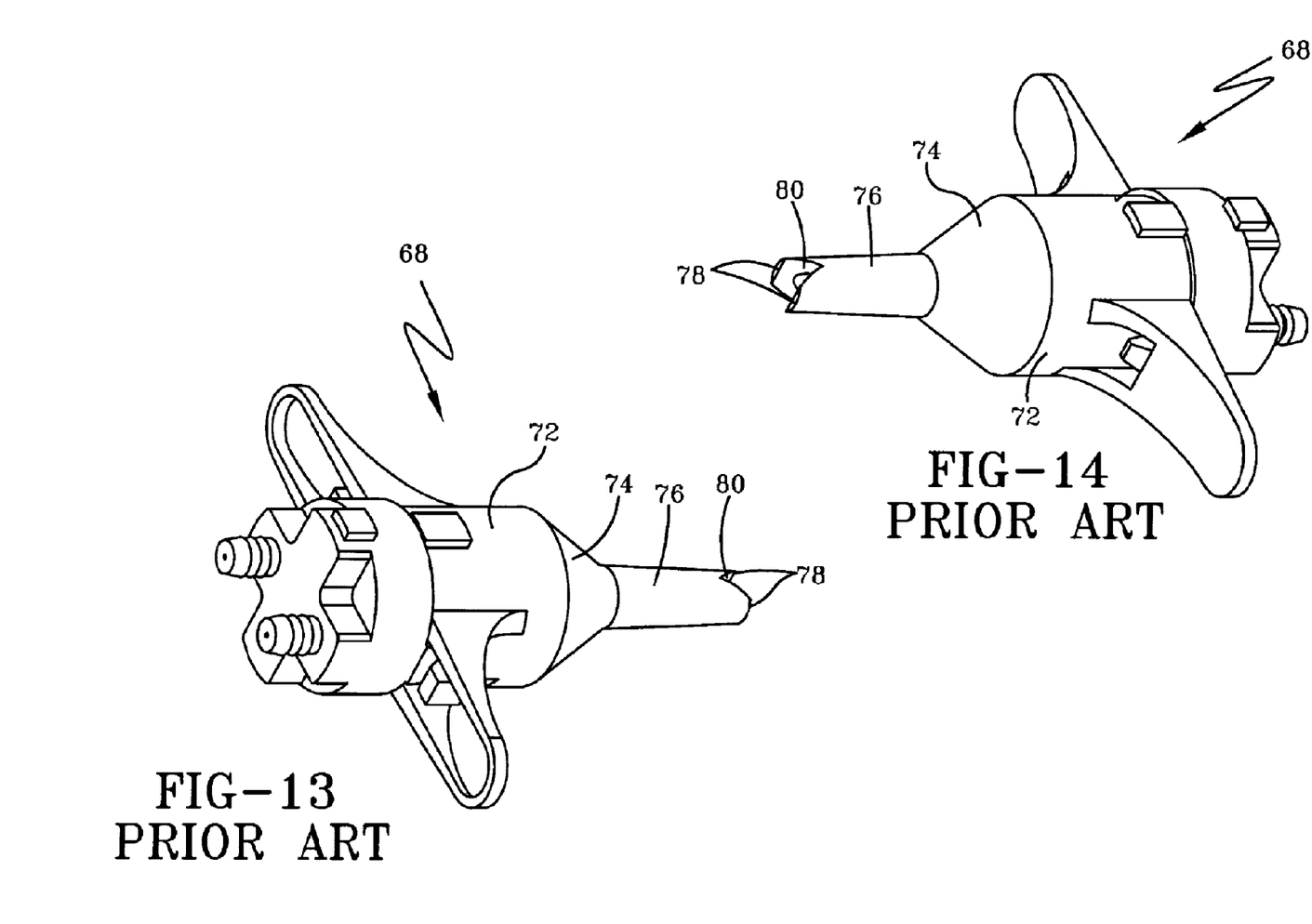
FIG. 13 is a rear perspective view of the nozzle of FIG. 12.
FIG. 14 is a front perspective view of the nozzle of FIG. 12.

The Versifoam Gun is used with the Versifoam tapered nozzle and is Prior Art made by RHH foam systems and listed in TABLE I above. The Versifoam tapered nozzle is similar in shape to the Fomo tapered nozzle (Prior Art), shown in FIGS. 10-11. The Dow system, which is operated at pressures of approximately 200 psi, uses the Dow foam gun with the Dow nozzle 68, shown in FIGS. 12-14, and is Prior Art made by Dow Chemical company. The Dow nozzle with triangular wedge-shaped opening 68 has an internal static mixing mechanism 70 for combining the two components of the spray foam located within the first cylindrical volume 72 of the nozzle 68, as shown in FIG. 12. After mixing, the spray foam flows through a conical volume 74 which quickly decreases in diameter towards the tip 76 of the nozzle 68. The Dow nozzle has a pair of diverging lips 78 which meet to form a triangular notch 80. The lips 78 diverge from a bisecting central axis with an approximately 40° angle β between the lips 78.

The application rates measured in the experiment and shown in TABLE I were taken under ideal conditions, and not conditions that would normally be found in the field where encumbrances and obstacles decreasing the ideal application rate exist. When the application rates shown in TABLE I are extended out to one hour, the coverage rates would be unrealistic to expect in the field. The application rate in the field is commonly thought to be approximately 50% of that obtained under ideal conditions, as more time is necessary to move equipment around the area being insulated and maneuver around obstacles such as wall studs. Detailed work such as working around fixtures or in small areas will also extend the time necessary to insulate the desired area. For example, the application rate for the gun and nozzle of this invention extrapolates to 6,156 Ft$^2$/hr (102.6 Ft$^2$/min×60 min). However, in the realistic conditions seen in the field such as maneuvering through different rooms, working around already installed electrical outlets, and insulating between wall studs and other small areas requiring detail oriented application the application rate for ½" of foam application is approximately 3,000 Ft$^2$/hr.

The environment within which a surface is insulated affects the physical properties of the foam that is produced by the system. In an ideal environment of optimum suggested ambient temperatures and humidity, the curing process for the polyurethane foam used in a preferred embodiment of this invention is approximately 30-60 seconds to the tack-free fully expanded state, cuttable in 2-5 minutes and fully cured in 1 hour. The foam expands 3-5 times the dispensed volume in typical applications, and may expand as much as 8 times the dispensed volume in specific applications, depending on various factors such as cavity size, ambient conditions, etc. The R-value of the foam after curing is 6.2/inch and the foam is at least 90% closed cell. Environmental factors such as temperature, humidity, and exposure to the elements can affect the properties of the foam.

The temperature and moisture levels of the environment in which the application of the spray polyurethane foam will take place are critical to the strength of the bond between the insulation and the substrate being insulated, as well as the properties of the foam insulation. The froth foam insulation should only be sprayed on dry, clean surfaces that are free of all moisture, ice, oil or other surface contaminates. Extreme low temperatures can drastically affect the bonding of the spray insulation to the substrate surface intended to be insulated. In an experiment replicating the conditions of a cold, frost covered substrate surface, seven samples of oriented strand board ("OSB"), the material used to construct the walls of most new, wood built residential houses in the United States, were sprayed with froth foam polyurethane insulation. Seven more samples of OSB were sprayed with water, and then sprayed with froth foam polyurethane insulation. After 24 hours of curing time at ambient temperature, the bond between the polyurethane insulation and the dry boards were able to withstand an average of 25.9 psi of pressure, at which the OSB splintered, but the bond between the foam and the board remained intact. The wet boards, on the other hand, were able to withstand less than 1.0 psi of pressure before the polyurethane insulation pealed off of the boards in sheets. This value is indicative of essentially no measurable adhesion.

However, unlike the prior art, when heated hoses are used on the system of this invention, the foam application can be used at any temperature above 20° F., a temperature which is about 15-20° F. lower than other spray foaming systems currently used, due to the combination of the unique properties of the closed cell polyurethane foam and the constant temperature of the chemicals due to the heated hoses. The foam composition used for this invention is pre-pressurized and takes approximately 30-45 seconds to react when mixed. The longer cure time gives the foam an extended time to bond to the substrate it is applied to, creating a better bond with the substrate, and allowing it to bond properly in environments colder than the foam of prior art. Occasionally, it may be necessary to slightly change the pressure of the "B" component cylinder in environments that are less than 40° F., in order to achieve equal mix rations of the "A" and "B" components of the spray polyurethane foam insulation. This procedure is not recommended often, and only has a small impact on the foam's ability to properly cure in temperatures down to 20° F. It is important to note that in cold temperatures the spray foam may have a longer curing time, and may take a few minutes to reach a non-tacky state.

Referring back to FIG. 1, in a preferred embodiment the method of rapidly insulating a desired surface would begin with placing two identically sized chemical storage tanks 12 and 14, one "A" tank and one "B" tank, in a hot box or other controlled temperature facility at 70-80° F. The chemical storage tanks 12 and 14 would remain in the temperature controlled facility until the temperature of the chemicals inside matched the ambient. This process could take hours or days depending on the original temperature of the chemicals after transporting and storing them at the construction site.

The chemical storage tank 12 holding the "A" component of the two-part spray polyurethane foam of this specific embodiment of the invention stores a mixture that is preferably 88%-96% "A" side formula and 6%-10% blowing agent 134$a$ (1,1,1,2-tetrafluoroethane). The "A" side formula is 100% Polymeric diphenylmethane diisocyanate (MDI). The chemical storage tank 14 holding the "B" component of the two-part spray polyurethane foam stores a mixture that is approximately 78-86% "B" side formula, 14%-22% blowing agent 134$a$ (1,1,1,2-tetrafluoroethane). The "B" side formula is approximately comprised of 23% polyether polyol (functionality between 4-5), 25% polyester polyol (functionality approximately 2), 4% polyether polyol (functionality approximately 3), 40% Flame retardant (chlorinated phosphate), 2% surfactant (propoxy-ethoxylated siloxane), 2% catalyst (tertiary amine), 3% catalyst (metal salt), and 1% water.

When the chemicals are the suggested temperature, the chemical storage tanks 12 and 14 are moved to the operating site near the desired surface being insulated, along with the rest of the spray insulation system 10. A regulator and couplings 20, and a hose 18 are attached to a full or almost full nitrogen bottle 16, which is then attached to pressurize the chemical storage tanks 12 and 14. The chemical storage tanks 12 and 14 are pressurized to 200 psi. The nitrogen bottle or cylinder 16 will be replaced when it reaches the minimum level of 500 psi to ensure adequate nitrogen levels for consistent pressurizing of the chemical storage tanks 12 and 14.

Two heated chemical transport hoses 22 and 24 will plug into a common 120V/60 Hz outlet, and the embedded heating elements 30 will warm the hoses to the appropriate temperature. The transport hoses 22 and 24 will be attached, one to each chemical storage tank 12 and 14. The other ends of the transport hoses 22 and 24 will be attached to each input line of the foam dispensing gun 26. A triangular prism shaped nozzle 34 in FIG. 2, will be snapped on to the butt of the dispensing gun 26 in FIG. 1.

When the chemical transport hoses 22 and 24 have heated to approximately 80° F., the trigger 32 on the dispensing gun 26 can be pulled, allowing the polyurethane froth foam to be sprayed on to the desired substrate surface, for example, an interior wall between 2×4's stretched with mesh. The dispensing gun 26 should be kept approximately 6-8" from the substrate surface, and should be kept at a 90° angle from the surface. The dispensing gun is moved in a steady, constant motion and each spray pass is slightly overlapped to ensure total coverage. The ambient temperature of the environment in which the system is operating in is approximately 45° F. with low humidity. The temperature of the substrate is approximately 49° F. and there is no water, or other impurities within or on the substrate.

The foam has cured to a non-tack state within one minute, is cuttable within five minutes and is completely cured after one hour. When the spraying is complete, the system 10 is shut down and unplugged, with chemical left in the transporting hoses 22 and 24, the dispensing gun 26 is cleaned with solvent and stored with the rest of the system, and the nozzle 34 is disposed.

Described herein is a system and a process for using the system which is comprised of at least two enclosed volumes acting as storage tanks to chemical components of polyurethane spray insulation; a means of pressurizing the storage volumes to low pressures; at least two conduits, each with an interior and exterior surface and first and second opposing end, connected to the storage volumes and a mixing and dispensing apparatus; and a nozzle with a triangular prism-shaped opening with internal static mixing, a thin rectangular opening, and a pair of essentially planar diverging lips. The conduits may have at least one heating element embedded between at least a portion of the interior and exterior surfaces of the conduits or adjacent in contacting engagement with the exterior surface, and may have a protective, optionally insulating cover surrounding at least a portion of the length of the conduits. The commonly portable system is appropriate for insulating a surface with spray froth foam polyurethane insulation at rates in excess of 70 $Ft^2$/min at temperatures greater than 20° F.

Therefore, what has been shown is a cost-effective and rigid foam insulation process which depends on several variable elements: static chemical mixing coupled with egress through a rectangularly-shaped nozzle tip in cross-section; low pressure (preferably 300 psi and more preferably 200 psi) in the cylinders containing the "A" and "B" components; transport lines heated by heating elements and possibly surrounded in a protective insulating sheath or cover such as a woven fiberglass sheath which allow the chemicals to maintain the desired temperature of preferably between 70° F. and 90° F. and more preferably between 70° F. and 80° F. to enable transport at the proper rates and proper mixing through significant travel distances from the storage tanks to the end application nozzle; and application rates of at least 70 $Ft^2$/min, more preferably 80 $Ft^2$/min and most preferably 90 $Ft^2$/min. In a fully optimized setting, application rates of more than 100 $Ft^2$/min are achievable.

In the foregoing description, certain terms have been used for brevity, clearness, illustration and understanding; but no unnecessary limitations are to be implied therefrom beyond the requirements of the prior art, because such terms are used for descriptive purposes and are intended to be broadly construed. Moreover, this invention has been described in detail with reference to specific embodiments thereof, including the respective best modes for carrying out each embodiment. It shall be understood that these illustrations are by way of example and not by way of limitation.

What is claimed is:

1. A process for insulating a desired surface with spray foam insulation which comprises:
   (a) pressurizing at least two storage volumes containing chemical components of polyurethane spray insulation to a pressure less than or equal to about 200 psi;
   (b) attaching one end of a pair of heatable conduits to said storage volumes;
   (c) attaching opposed ends of said conduits to a mixing and dispensing nozzle, said nozzle comprising:
      (i) a body;
      (ii) a removable nozzle attached to said body,
      (iii) said nozzle having a static mixing means within said nozzle;
      (iv) said nozzle further having a pair of lips diverging at an angle of between about 8° and 15° inclusive; and
      (v) said nozzle further having a pair of opposed essentially triangular-shaped notches at each end of said lips; and
   (d) dispensing said insulation on said desired surface at an application rate greater than or equal to approximately 70 $Ft^2$/min.

2. The process of claim 1 wherein said storage volumes are portable.

3. The process of claim 2 wherein said step of pressurizing said storage volumes is by use of an inert gas.

4. The process of claim 3 wherein said inert gas is nitrogen.

5. The process of claim 4 wherein said nozzle further comprises a trigger to control dispensing rate.

6. The process of claim 1 wherein said conduits have an insulating cover along at least a portion of a length of said conduits.

7. The process of claim 6 wherein said insulating cover is a fiberglass sheath.

8. The process of claim 1 wherein
   said application rate is greater than or equal to approximately 80 $Ft^2$/min.

9. The process of claim 8 wherein
   said nozzle lips diverge at an angle between 10 and 12° inclusive; and
   said application rate is greater than or equal to approximately 90 $Ft^2$/min.

10. A process for insulating a desired surface with spray foam insulation which comprises:
    (a) pressurizing at least two storage volumes containing chemical components of polyurethane spray insulation to a pressure less than or equal to about 200 psi;
    (b) attaching one end of a pair of heatable conduits to said storage volumes;
    (c) attaching opposed ends of said conduits to a mixing and dispensing nozzle, said nozzle comprising:
       (i) a body;
       (ii) a removable nozzle attached to said body,
       (iii) said nozzle having a static mixing means within said nozzle;
       (iv) said nozzle further having a pair of lips diverging at an angle of between about 8 and 15° inclusive; and
       (v) said nozzle further having a pair of opposed notches at each end of said lips; and
    (d) dispensing said insulation on said desired surface at an application rate greater than or equal to approximately 80 $Ft^2$/min.

11. The process of claim 10 wherein said storage volumes are portable.

12. The process of claim 11 wherein said step of pressurizing said storage volumes is by use of an inert gas.

13. The process of claim 12 wherein said inert gas is nitrogen.

14. The process of claim 13 wherein said nozzle further comprises a trigger to control dispensing rate.

15. The process of claim 10 wherein said conduits have a protective cover along at least a portion of a length of said conduits.

16. The process of claim 15 wherein said protective cover is a woven fiberglass sheath.

17. The process of claim 10 wherein
    said nozzle lips diverge at an angle between 10 and 12° inclusive; and
    said application rate is greater than or equal to approximately 90 $Ft^2$/min.

18. The process of claim 17 wherein said application rate is greater than or equal to approximately 100 $Ft^2$/min.

19. A process for insulating a desired surface with spray foam insulation which comprises:
   (a) pressurizing at least two portable storage volumes containing chemical components of a two-component polyurethane spray insulation to a pressure less than or equal to about 200 psi with nitrogen;
   (b) attaching one end of a pair of sheathed, heated conduits to said storage volumes, said conduits heated to approximately 70° F. to 90° F. inclusive;
   (c) attaching opposed ends of said conduits to a mixing and dispensing nozzle, said nozzle comprising:
      (i) a body;
      (ii) a removable nozzle attached to said body,
      (iii) said nozzle having a static mixing means within said nozzle;
      (iv) said nozzle further having a pair of essentially planar lips diverging at an angle of between about 10 and 12° inclusive;
      (v) said nozzle further having a pair of opposed notches at each end of said lips; and
      (vi) said nozzle further comprising a trigger to control dispensing; and
   (d) dispensing said insulation on said desired surface at an application rate greater than or equal to approximately 90 $Ft^2$/min.

20. The process of claim 19 wherein said application rate is greater than or equal to approximately 100 $Ft^2$/min.

* * * * *